US005617399A

United States Patent [19]
Spruit et al.

[11] Patent Number: 5,617,399
[45] Date of Patent: Apr. 1, 1997

[54] WRITE INTENSITY CALIBRATION OF A RECORDING BEAM BY READING A TEST PATTERN WRITTEN ON A BUFFER SECTOR OF A RECORD CARRIER

[75] Inventors: Johannes H. M. Spruit; Johannus L. Bakx, both of Eindhoven, Netherlands

[73] Assignee: U.S. Philips Corporation, New York, N.Y.

[21] Appl. No.: 386,786

[22] Filed: Feb. 10, 1995

[30] Foreign Application Priority Data

Feb. 14, 1994 [EP] European Pat. Off. ............... 94200384
Apr. 22, 1994 [EP] European Pat. Off. ............... 94201113

[51] Int. Cl.$^6$ ....................................... G11B 7/00
[52] U.S. Cl. ............... 369/116; 369/54; 369/58; 369/275.3
[58] Field of Search .................. 369/54, 58, 116, 369/13, 275.3, 59, 124

[56] References Cited

U.S. PATENT DOCUMENTS

| | | | |
|---|---|---|---|
| 4,866,686 | 9/1989 | Verboom | 369/32 |
| 5,140,580 | 8/1992 | Ohara et al. | 369/116 |
| 5,185,733 | 2/1993 | Finkelstein et al. | 369/54 |
| 5,268,893 | 12/1993 | Call et al. | 369/116 |
| 5,418,773 | 5/1995 | Bakx et al. | 369/275.1 |
| 5,450,383 | 9/1995 | Call et al. | 369/116 |
| 5,463,600 | 10/1995 | Kirino et al. | 369/116 |
| 5,471,457 | 11/1995 | Bakx et al. | 369/116 |
| 5,475,666 | 12/1995 | Ito et al. | 369/116 |
| 5,537,381 | 7/1996 | Fuji | 369/116 |

FOREIGN PATENT DOCUMENTS

| | | | |
|---|---|---|---|
| 0312143 | 4/1989 | European Pat. Off. | G11B 13/04 |
| 0310162 | 4/1989 | European Pat. Off. | G11B 7/095 |
| 0393001 | 10/1990 | European Pat. Off. | G11B 7/12 |
| 0404251 | 12/1990 | European Pat. Off. | G11B 7/007 |
| 0400726 | 12/1990 | European Pat. Off. | G11B 11/10 |
| 0577214 | 1/1994 | European Pat. Off. | G11B 7/007 |
| 0599389 | 6/1994 | European Pat. Off. | G11B 20/18 |
| 3116566 | 5/1991 | Japan | G11B 1/10 |
| 8602304 | 4/1988 | Netherlands | G11B 11/10 |
| 9326001 | 12/1993 | WIPO | G11B 7/00 |

*Primary Examiner*—Georgia Y. Epps
*Assistant Examiner*—Kim-Kwok Chu
*Attorney, Agent, or Firm*—Leroy Eason

[57] ABSTRACT

Disclosure is given of a device and method for recording by means of a radiation beam user information on a record carrier. The user information is written in the form of optically detectable marks in concentric tracks. The tracks are subdivided into sectors. The record carrier used has ring-shaped zones. Within these zones lie the sectors aligned seen in radial direction. For writing the marks in the tracks, a write intensity of the radiation beam is set to a determined set value. For this purpose, a test information pattern is written in a buffer sector which is situated on an edge of a zone. Then the test information pattern is read back during which operation the test information pattern is converted to a corresponding test data pattern. Based upon the test data pattern a set value for the write intensity is determined.

17 Claims, 5 Drawing Sheets

| Zone Number | Number of Sector/ Tracks | Start Track | Tracks with buffer sectors | Data Tracks | Number of Data Tracks | Tracks with buffer sectors | End Track |
|---|---|---|---|---|---|---|---|
| 0 | 30 | 0 | 0-1 | 5-1377 | 1373 | 1378-1379 | 1379 |
| 1 | 32 | 1380 | 1380-1381 | 1382-2849 | 1468 | 2850-2851 | 2851 |
| 2 | 34 | 2852 | 2852-2853 | 2854-4413 | 1560 | 4414-4415 | 4415 |
| 3 | 36 | 4416 | 4416-4417 | 4418-6069 | 1652 | 6070-6071 | 6071 |
| 4 | 38 | 6072 | 6072-6073 | 6074-7817 | 1744 | 7818-7819 | 7819 |
| 5 | 40 | 7820 | 7820-7821 | 7822-9657 | 1836 | 9658-9659 | 9659 |
| 6 | 42 | 9660 | 9660-9661 | 9662-11589 | 1928 | 11590-11591 | 11591 |
| 7 | 44 | 11592 | 11592-11593 | 11594-13613 | 2020 | 13614-13615 | 13615 |
| 8 | 46 | 13616 | 13616-13617 | 13618-15729 | 2112 | 15730-15731 | 15731 |
| 9 | 48 | 15732 | 15732-15733 | 15734-17893 | 2160 | 17938-17939 | 17939 |
| Total | | | | | 17853 | | |

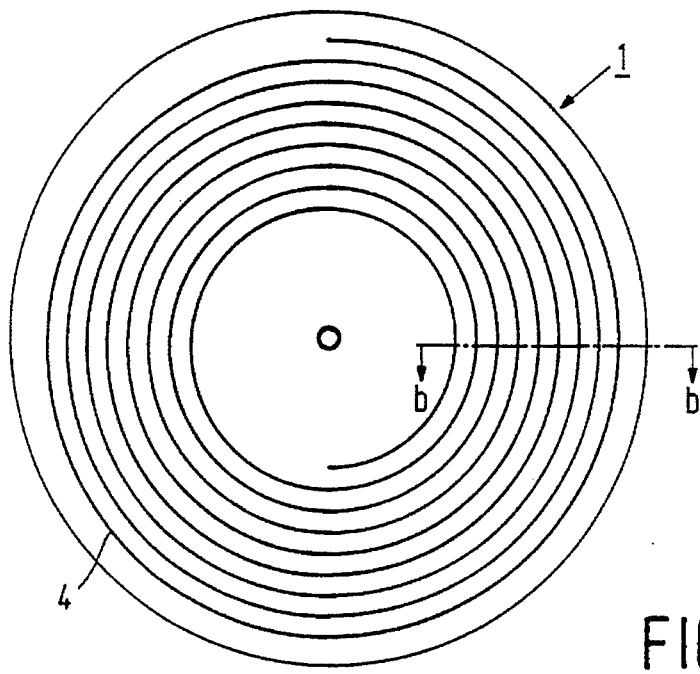
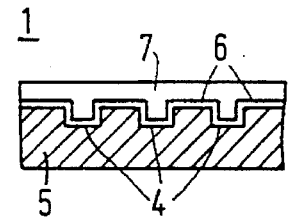
FIG. 1b PRIOR ART
FIG. 1a PRIOR ART
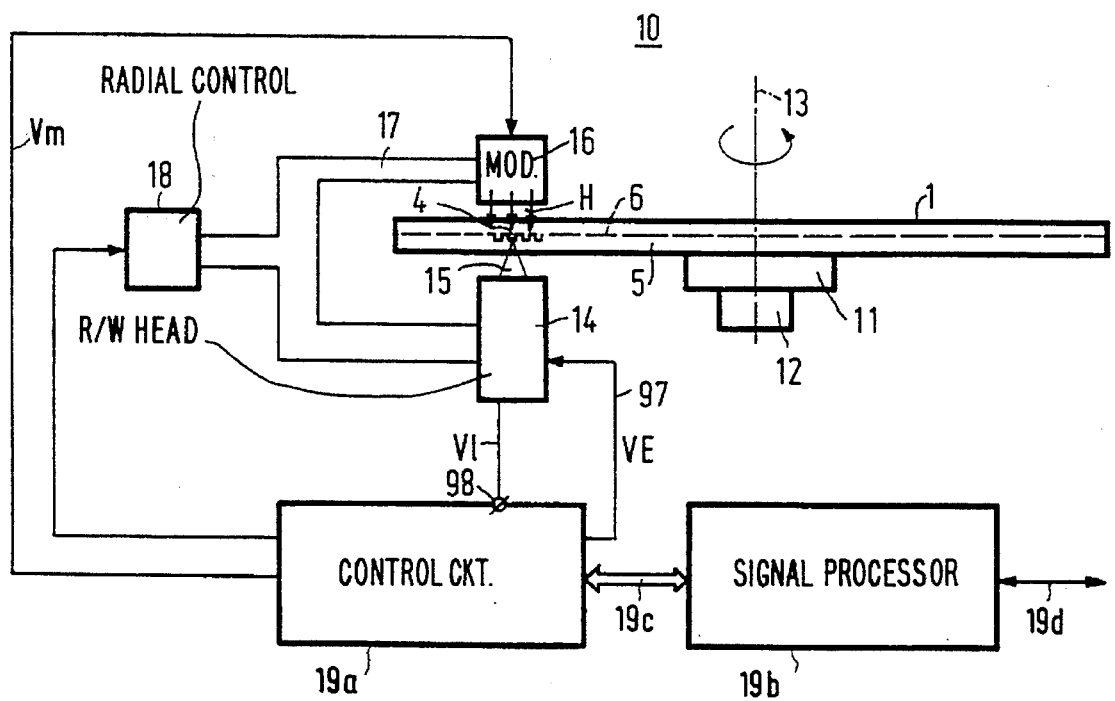
FIG. 2

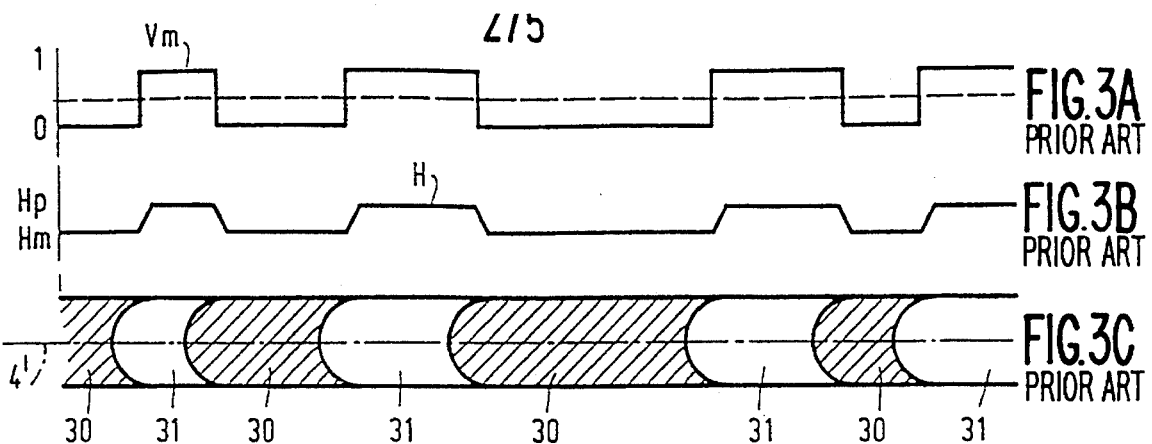
FIG. 3A PRIOR ART
FIG. 3B PRIOR ART
FIG. 3C PRIOR ART
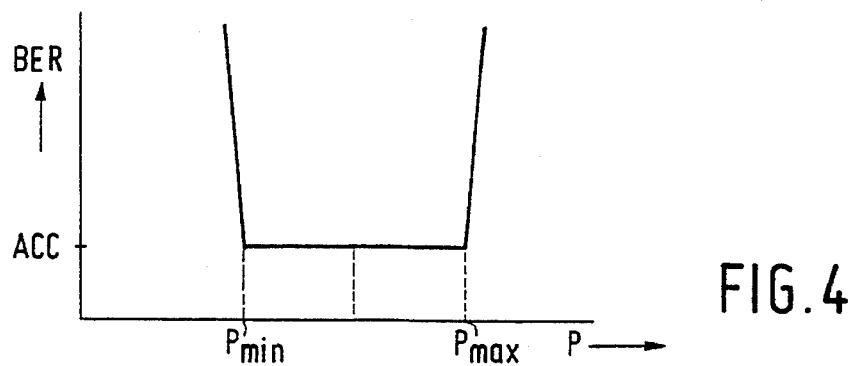
FIG. 4
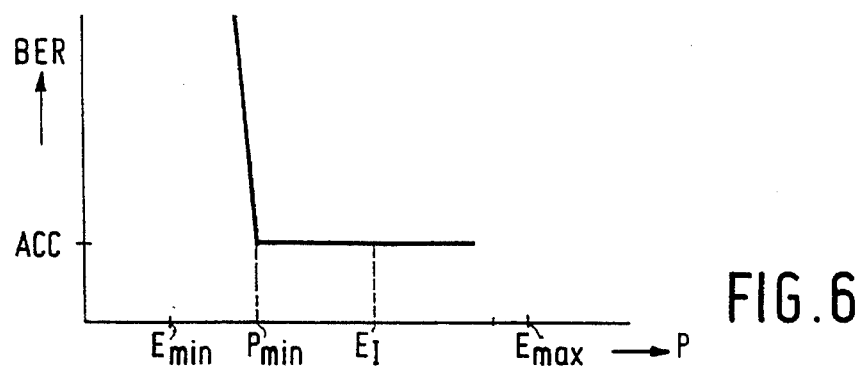
FIG. 6
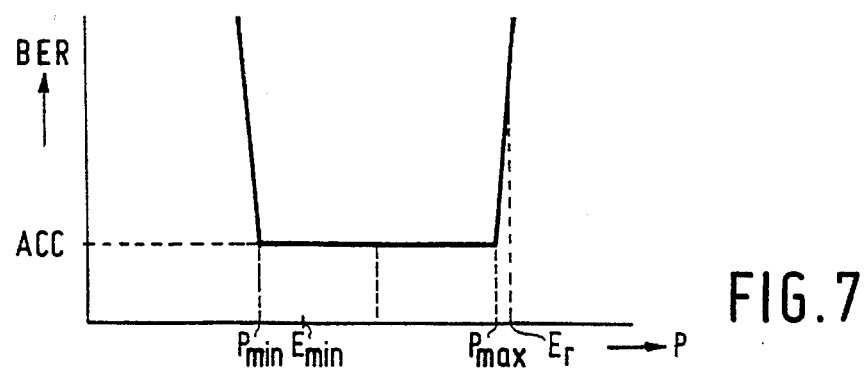
FIG. 7

| Zone Number | Number of Sector/ Tracks | Start Track | Tracks with buffer sectors | Data Tracks | Number of Data Tracks | Tracks with buffer sectors | End Track |
|---|---|---|---|---|---|---|---|
| 0 | 30 | 0 | 0 – 1 | 5 – 1377 | 1373 | 1378 – 1379 | 1379 |
| 1 | 32 | 1380 | 1380 – 1381 | 1382 – 2849 | 1468 | 2850 – 2851 | 2851 |
| 2 | 34 | 2852 | 2852 – 2853 | 2854 – 4413 | 1560 | 4414 – 4415 | 4415 |
| 3 | 36 | 4416 | 4416 – 4417 | 4418 – 6069 | 1652 | 6070 – 6071 | 6071 |
| 4 | 38 | 6072 | 6072 – 6073 | 6074 – 7817 | 1744 | 7818 – 7819 | 7819 |
| 5 | 40 | 7820 | 7820 – 7821 | 7822 – 9657 | 1836 | 9658 – 9659 | 9659 |
| 6 | 42 | 9660 | 9660 – 9661 | 9662 – 11589 | 1928 | 11590 – 11591 | 11591 |
| 7 | 44 | 11592 | 11592 – 11593 | 11594 – 13613 | 2020 | 13614 – 13615 | 13615 |
| 8 | 46 | 13616 | 13616 – 13617 | 13618 – 15729 | 2112 | 15730 – 15731 | 15731 |
| 9 | 48 | 15732 | 15732 – 15733 | 15734 – 17893 | 2160 | 17938 – 17939 | 17939 |
| Total | | | | | 17853 | | |

FIG. 11

WRITE INTENSITY CALIBRATION OF A RECORDING BEAM BY READING A TEST PATTERN WRITTEN ON A BUFFER SECTOR OF A RECORD CARRIER

BACKGROUND OF THE INVENTION

The invention related to a method of recording signals on a record carrier of an inscribable type, the record carrier having substantially concentric tracks which are divided into sectors, and the record carrier having ring-shaped zones in which the sectors, seen in radial direction, are in line, in which method user information patterns of optically detectable marks are written in the sectors whilst for the writing of the marks the tracks are scanned by a radiation beam which has a write intensity that has a determined set value.

The invention further relates to a recording device for recording information on a record carrier of an inscribable type, the record carrier having substantially concentric tracks which are divided into sectors, and the record carrier having ring-shaped zones in which the sectors, seen in radial direction, are in line, which recording device comprises scanning write means for writing in the sectors data-pattern-equivalent user information patterns of optically detectable marks by means of a scanning radiation beam which has a write intensity that has a determined set value.

Such a method and such a device for recording signals on a record carrier is known from EP-A-0 577 214, to which U.S. Pat. No. 5,418,773 corresponds.

Information recording on such a zoned record carrier is advantageous in that a high information density is obtained.

For a reliable recording, that is to say, a recording from which the recorded information can be readily read back, it is desirable to set the write intensity to a correct value.

SUMMARY OF THE INVENTION

It is an object of the invention to provide means by which a correct set value of the write intensity can be determined efficiently.

A method according to the invention is thereto characterized in that a test information pattern is written in at least one buffer sector positioned on an edge of one of the zones, which written test information pattern is read and converted to a corresponding data pattern, and the set value for the write intensity for writing the user information patterns is determined in dependence on the test data pattern.

A device according to the invention is thereto characterized in that the device comprises write intensity determining means for determining said set value for the write intensity, which write intensity determining means comprise means for writing a test information pattern in a buffer sector of a zone, the buffer sector being constituted by tracks nearest an edge of the zone, read means for reading the test information pattern and for converting the read test information pattern to a corresponding signal, and determining means for determining the set value in dependence on to this signal.

On zoned record carriers the buffer sectors, which are at the beginning (or end) of the zones, are radially not well aligned relative to sectors in adjacent tracks. As a result, these buffer sectors are less suitable for recording user information.

For that matter, due to this misalignment, there is not always a guarantee that recorded information is read back correctly.

Therefore, these buffer sectors are not used for recording user information.

However, for determining the write intensity setting in response to test information patterns, the requirements for correct reading are much less stringent. Therefore, these buffer sectors can be used to advantage for determining the write intensity. The use of the buffer sectors for determining the write intensity is advantageous in that this is not at the loss of space available for recording the user information.

An embodiment of the invention is characterized in that in based on the test data patterns which correspond to the read test information patterns, written in buffer sectors of at least two different zones, associated set values of the write intensities are determined, and, by interpolation between these determined set values, the write intensity set value is determined for writing user information patterns in the zones positioned between said different zones.

This embodiment is advantageous in that in the case where write parameters, especially the radiation sensitivity of the recording layer, are not uniform over the entire record carrier, still a correct set value of the write intensity is obtained for each zone. Preferably, set values are used in the interpolation, one set value being determined in response to the test information patterns in a zone near the inner edge and another set value being determined in response to test information patterns in a zone near the outer edge of the record carrier.

Not to disturb the reading of written user information unnecessarily, the test information patterns are preferably erased before novel user information is written with the newly determined set value.

A further embodiment for the method is characterized in that an error rate is detected in the test data pattern by means of an error detection and correction algorithm, after which the set value is determined based on the error rate.

In this embodiment is utilized the error detection and correction algorithm already used anyway when signals are recorded. If, after a test information pattern has been written, which pattern is derived from a random or freely selectable test data pattern, the written information pattern is read and processed with the error detection and correction algorithm, it is possible to detect the magnitude of the error rate in the known test data pattern. With the error rate found it is now possible to adjust the intensity of the radiation beam in the desired direction.

The embodiment having automatic optimum setting of the write intensity is pre-eminently suitable for recording devices in which the recording of the marks strongly depends on the write intensity, such as, for example, in magnetooptical recording devices. However, the invention is not restricted to magnetooptical recordings, but may likewise be applied to other recording principles, such as, for example, re-inscribable recordings on record carriers of the phase-change type, for which a record carrier is used whose structure can be changed when scanned by a radiation beam from amorphous to crystalline and vice versa depending on the radiation method.

BRIEF DESCRIPTION OF THE DRAWINGS

Further embodiments and their advantages will be described in detail hereafter with reference to the drawing FIGS. 1 to 8, in which:

FIGS. 1a and 1b show a known type of inscribable record carrier;

FIG. 2 shows a magnetooptical device according to the invention;

FIG. 3 shows a conventional write signal and the corresponding information pattern;

FIG. 4 shows read reliability plotted against write intensity;

FIG. 6 shows a first situation of an initial write intensity plotted against the write window in the error rate characteristic curve;

FIG. 7 shows a further situation of an initial write intensity plotted against the write window;

FIG. 11 shows a possible arrangement of a zoned record carrier.

DESCRIPTION OF THE PREFERRED EMBODIMENTS

Figure 5:
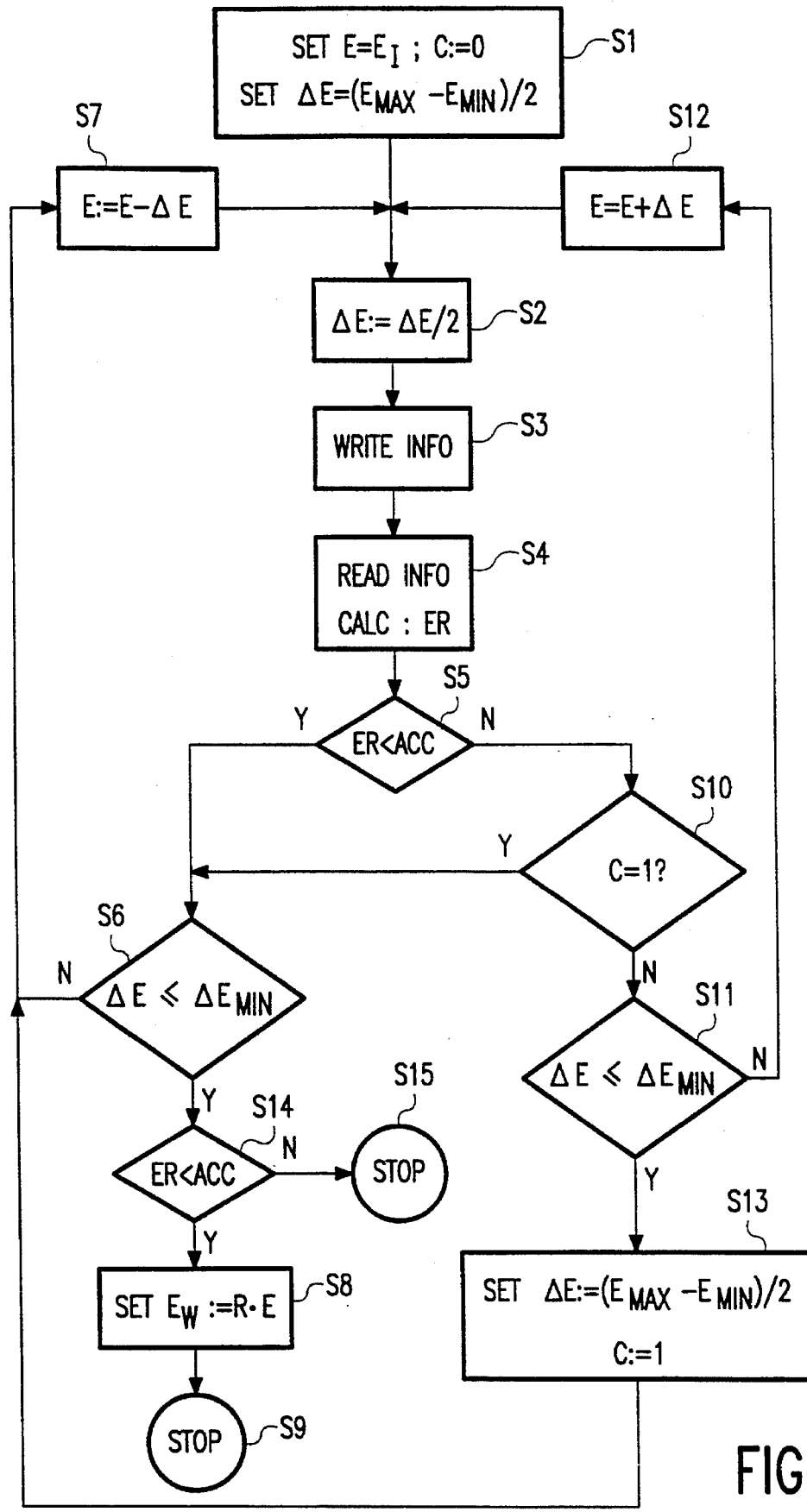
FIG. 5 shows a flow chart of a preferred embodiment for a method of adjusting the write intensity according to the invention.

FIG. 1 shows a record carrier 1 of an inscribable type, FIG. 1a showing the top view and FIG. 1b giving a small part of the sectional view along line b—b. The record carrier 1 has a track pattern which indicates information areas, also referenced tracks hereafter, positioned substantially concentrically relative to each other, which are intended for recording information in the form of information patterns of optically detectable marks. The tracks may be established, for example, by the windings of a continuous helical groove 4 or by concentric grooves in a substrate 5. Instead of being formed by the grooves themselves, the tracks can also be formed by the lands positioned between the grooves. The concentric tracks can not only be formed by grooves, but also by a structure of so-termed servo patterns, such as described in, for example, U.S. Pat. No. 4,866,686 and EP-A0.310.162. For the purpose of recording, the record carrier 1 has a recording layer 6 which is deposited on the transparent layer 5 and covered by a protective layer 7. The information layer 6 is of a customary type in which a radiation beam having a write intensity exceeding a specific threshold value can write an optically detectable character. The information layer 6 may be formed by a material suitable for magnetooptical recording. There should be observed that information layer 6 may, however, also be formed by other materials such as, for example, a so-termed phase-change material whose structure may be changed from amorphous into crystalline and vice versa by suitable radiation methods.

To attain a high information density on the record carriers, often a so-termed zoned record carrier is used. A record carrier of this type is described in detail in EP-A0 577 214 (U.S. Pat. No. 5,418,773), which document is deemed incorporated in the description by reference.

Figure 8:
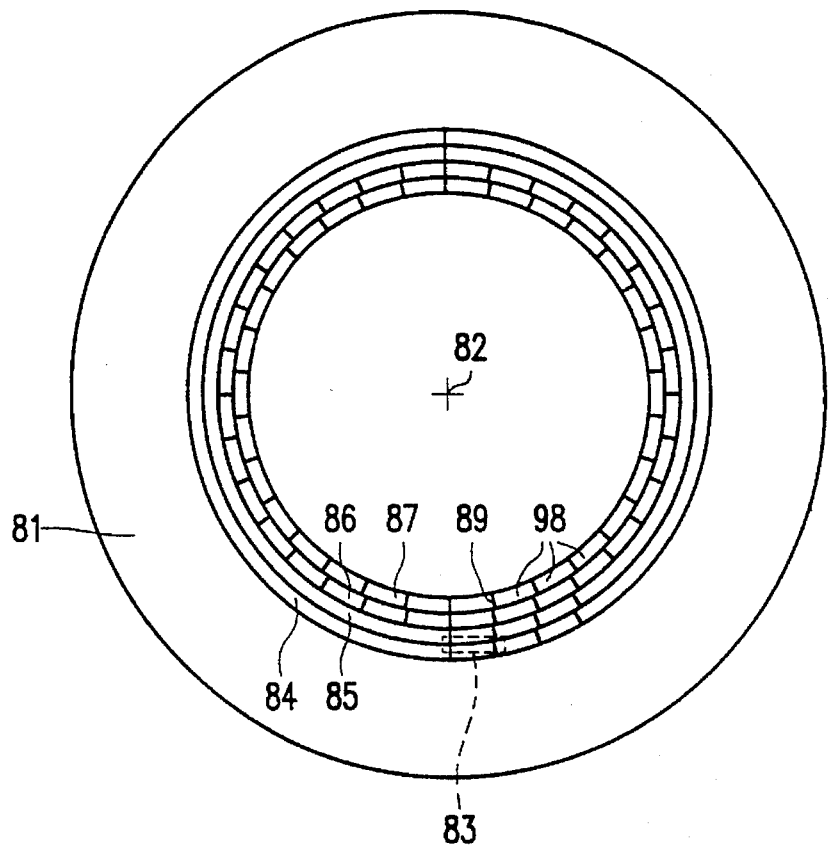
FIG. 8 shows a top view of a known type of zoned record carrier.

By way of illustration FIG. 8 shows a possible embodiment for a zoned record carrier.

FIG. 8 shows by way of example a top view of a zoned record carrier 81. The substantially circular tracks are concentrically positioned around a point of rotation 82. The record carrier 81 is subdivided into ring-shaped zones of which four are represented in FIG. 8. They are referenced 84, 85, 86, and 87. Each zone has well over a thousand tracks, and each track is divided into an integral number of n=8 radial sectors which all have the same information capacity of, for example, 512 data bytes. Within each zone the number of sectors per track (one revolution) is the same. Each sector has a so-termed header portion at one end thereof which accommodates control information for controlling the recording and/or reading of information. Within each zone are aligned sectors seen in radial direction. Furthermore, each sector has a data portion in which the user information is recorded or can be recorded.

The record carrier 81 is divided into zones, so that the number of sectors per track in successive zones changes by two each time. FIG. 8 shows only the total number of sectors for each track for the zones 86 and 87. In the other zones the tracks are similarly divided into sectors.

Figure 9:
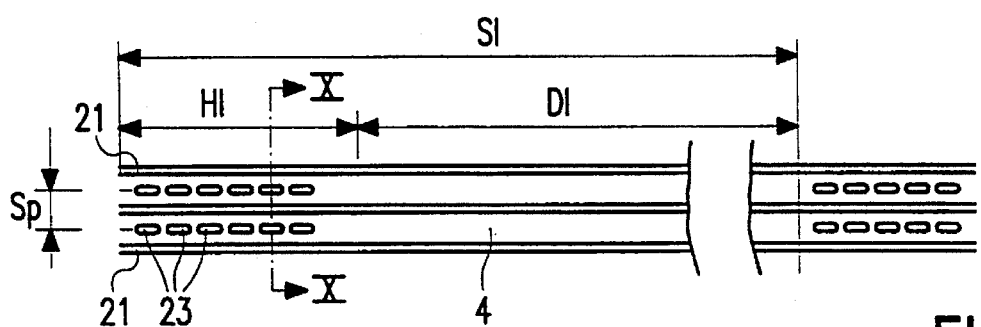
FIGS. 9 and 10 show in strongly enlarged form details of the record carrier shown in FIG. 8.
Figure 10:
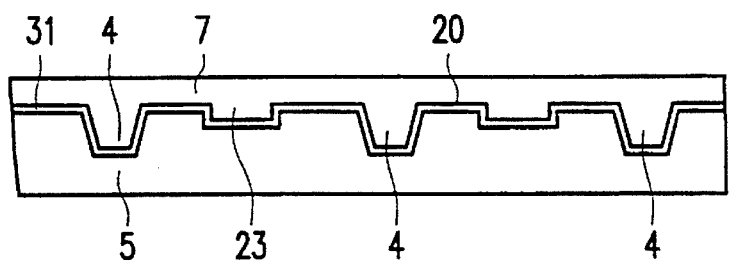

FIG. 9 shows a strongly enlarged part 83 of the top view of the record carrier 81 for the case where the positions of the tracks are determined by grooves in a substrate. A sectional view of the part 83 along line X—X is shown in FIG. 10. In the FIGS. 9 and 10 the grooves are referenced 4. The lands 20 between the grooves 4 form the tracks in which the information is recorded or can be recorded. The substrate is referenced 5. The side of the substrate 5 in which the grooves 4 are realised is covered by the recording layer 6. The length of a sector is denoted S1 in FIG. 9. The track pitch, i.e. the distance between the centres of adjacent tracks 20, is referenced Sp.

The length of the header portion of the sector is referenced H1. The length of the data portion of the sector is referenced D1. The header portion has an optically detectable pattern of pits 23. This pattern is of a customary type which makes recognition of the header portion possible and the derival of a clock signal related to the data rate of the signal to be recorded or to be read out. Furthermore, the pit pattern in the header portion represents an address. The address comprises a part indicating a track number and a part indicating a sector number in the track.

In the inter-zone boundary areas the sectors are not aligned relative to each other (see FIG. 8). Preferably, the boundary areas of a number of the sectors are not used for recording user information. The buffer sectors are positioned at the beginning and end of each zone and can be formed, for example, by the first two and last two tracks of each zone. These sectors, not meant for recording user information, will be referenced buffer sectors further in this description.

These buffer sectors can be completely used for determining a set value of the (write) intensity of the radiation beam whilst a character is reliably formed in the recording layer 6.

By way of illustration FIG. 11 shows a Table presenting a possible distribution of the tracks over the zones. The first column of the Table shows the zone number. The second column shows the number of sectors for each track of this zone. The third and eighth columns show respectively, the track number of the first and of the last track in this zone. The fourth column shows the track numbers of the tracks having buffer sectors at the beginning of each zone. The sixth column shows the number of tracks in each zone intended for recording user information. The seventh column shows for each zone the track numbers of the tracks having buffer sectors at the end of the zone in question.

Preferably, buffer sectors positioned at the end of a zone are used for recording test information patterns. For in that case there are always sufficient sectors available for setting the write clock in response to the prerecorded structures available in the header portions H1. This is contrary to the buffer sectors at the beginning of a zone, because there a zone transient precedes the buffer sectors.

FIG. 2 shows an embodiment for a magnetooptical recording device 10 according to the invention, for recording information on the record carrier 1. The recording device 10 comprises a turn table 11 and a drive motor 12 to make the record carrier 1 rotate around an axis 13. Opposite to the rotating record carrier 1 is installed a customary-type optical read/write head 14 suitable for magnetooptical recording and reading by which read/write head 14 a radiation beam 15 is focused on the recording layer 6. The recording device 10 comprises customary tracking means (not shown) for keeping the radiation beam 15 focused on the servo track 4, customary focusing means for keeping the radiation beam 15 focused on the recording layer 6, and customary addressing means for searching for sectors in response to address information available in the header portions 98. Opposite to the read/write head 14, on the other side of the record carrier 1, a magnetic field modulator 16 is disposed for generating a magnetic field H directed essentially perpendicularly to the recording layer 6 in the spot on the recording layer 6 caused by the radiation beam 15. The magnetic field modulator 16 is rigidly connected to the read/write head 14 by a bracket 17. The read/write head 14 and the magnetic field modulator 16 can be moved in radial direction relative to the record carrier by a displacement system 18 whilst the bracket 17 provides that the magnetic field modulator 16 continues to be positioned dead opposite to the read/write head. The magnetic field modulator 16 is one of a type in which the direction of the generated magnetic field can be modulated in response to a binary write signal Vm. Such a magnetic field modulator is described in detail, for example, in EP-A0 312 143, which document is deemed to be incorporated in the description by reference.

Furthermore, the device 10 comprises a control circuit 19a for controlling the read/write head 14, the displacement system 18 and the generation of the write signal Vm. When information is recorded, the servo track 4 is scanned by the radiation beam 15 whose intensity is set to a write intensity which is sufficiently high to heat the part of the recording layer 6 being scanned by the radiation beam 15 close to the Curie temperature of the material of the recording layer 6. At the same time, the write signal Vm, and with it the generated magnetic field H, is modulated in accordance with the information to be recorded, so that a character pattern in the form of magnetic domains is developed corresponding to the write signal $V_m$ in the part of the servo track 4 that has already been scanned. The domains thus realised can be optically scanned as will be described in more detail hereafter.

Essential elements to the recording device 10 according to the invention are the signal processing means 19b which are coupled to the control circuit 19a over a two-way data bus 19c. The data bus 19c can be a serial data bus (1-bit-wide) or a parallel data bus (several-bits-wide). The signal processing means 19b receive a data pattern over a two-way (input and output) bus 19d, which data pattern is coded in the programmed signal processing means 19b with an error detection and correction algorithm (CIRC or other Reed Solomon code). The data pattern thus coded is applied to the control means 19a over the bus 19c, as is a set value of the write intensity of the radiation beam 15 with which intensity the information pattern corresponding to the coded data pattern is written in the recording layer 6 of the record carrier 1.

A read signal V1 corresponding to the information pattern that has been read is applied to the control circuit 19a by the read/write head 14. The control circuit 19a comprises customary extraction means which extract the encoded data pattern corresponding to the read information pattern from the read signal V1. The control circuit 19a transfers this extracted encoded data pattern over bus 19c to the processing means 19b which try to derive the original data pattern from the encoded data pattern with the error detection and correction algorithm. The processing means 19b then detect an error rate occurring in the data pattern and determine, in response to the error rate, a setting signal for setting the write intensity of the radiation beam 15. The control circuit 19a thereto receives the setting signal over bus 19c.

By way of illustration, FIG. 3 shows the wave pattern of the write signal Vm, the associated magnetic field H and attendant pattern of magnetic domains obtained with different directions of magnetization. The domains with different directions of magnetization are designated by different reference characters, that is, 30 and 31. The centre of the servo track 4 in which the pattern is recorded is diagrammatically shown by a line 4'. The pattern of magnetic domains 30, 31 can be read by the read/write head 14 which thereto scans the pattern with a radiation beam of linearly polarised light. Upon reflection of the radiation beam the direction of polarisation of the radiation beam is turned to a direction determined by the direction of magnetization of the scanned portion of the recording layer 6. In this manner a modulation pattern of variations of polarisation directions is obtained that corresponds to the scanned pattern of magnetic domains 30 and 31. This modulation is detected in a customary fashion in the read/write head 14 by means of, for example, a Wollaston prism, photoelectric converters, and an amplifier circuit which converts the output signals of the photoelectric converters to a read signal V1 which signal represents the pattern that has been read, as is described, for example, in Dutch Patent application NL-A 8602304.

One of the leading aspects of recording is the reliability with which the recorded information can be read out. A known parameter by which the reliability of reading recorded signals can be expressed, which signals contain redundancy data which makes error correction possible, is the so-termed (Byte) Error Rate, BER for short. The parameter BER denotes the number of information blocks during each unit of time, in which one or more uncorrectable errors are detected when the blocks are read out in accordance with the error detection and correction algorithm.

FIG. 4 shows the variation of the BER value as a function of the radiation beam write intensity P. It turns out that the BER value within a range from $P_{min}$ to $P_{max}$ assumes a substantially constant minimum value, whilst outside this range the BER value increases rapidly. Between the values $P_{min}$ and $P_{max}$ the reading reliability is substantially immune to variations in write intensity, which variations are unavoidable due to the various tolerances in the recording system.

In FIG. 4 the error rate BER is shown as a function of the write intensity P for a specific scanning speed of the track 4 during recording. In this case the optimum write intensity does not lie midway between $P_{min}$ and $P_{max}$, but just above $P_{min}$. For a certain record carrier the value of the optimum write intensity can be predetermined. Prior to the recording of information on that record carrier, the write intensity of the recording device can, in principle, be set to this value.

However, the following problems occur then:
1) There is a large variation in the radiation-sensitivity of different recording layers, even though they are made of the same magnetooptical material. This is caused by the customarily used method of depositing the recording layer, such as, for example, sputtering.

2) In practice it is a great problem to precisely determine an absolute radiation power. The spreading of power detectors mutually is of the order of 10%. Besides, different adjusting conditions cause additional deviations.

3) Furthermore, the shape of the scanning spot caused by the radiation beam on the recording layer 6 and the wavelength of the radiation also has an effect on the optimum write intensity.

4) Finally, the ambient temperature has a considerable effect on the optimum write intensity.

All this means that the variation of the optimum write intensity is so large that there can be no guarantee that with a fixed setting of the write intensity, this intensity will lie in the write intensity window of the record carrier in which window the BER value is low.

Below is given a description of a method in which the optimum write intensity can be reliably and simply set. First of all a description will be given of a preferred embodiment according to the invention with reference to FIG. 5, in which a flow chart of this preferred embodiment is shown.

FIG. 5 shows by way of example a flow chart of a programme executed by the device 10 to determine an optimum set value for the write intensity according to a method according to the invention. In a first step $S_1$ an initial write intensity $E_I$ of the described method, and an initial step size $\Delta E$ which denotes a change in the write intensity $E$, are set. Said step size $\Delta E$ is $(E_{max}-E_{min})/2$. Here $E_{max}$ and $E_{min}$ is the upper and the lower limit respectively, of the setting range of the intensity $E$ of the radiation beam 15. In a next step $S_2$ of the method the step size $\Delta E$ is halved. With these two steps the following is achieved. The initial write intensity $E_I$ is selected to be halfway the setting range of write head 14. By setting the step size $\Delta E$ in step $S_2$ there is achieved that for a next setting of the write intensity $E$ this intensity will be either the minimum intensity $E_{min}$ plus a quarter of the total setting range, or the maximum intensity $E_{max}$ minus a quarter of the setting range. In step $S_3$ a buffer sector (preferably a buffer sector situated at the end of the zone) is sought based upon the address in the sector header portions 88, after which a test information pattern is written in the sought buffer sector with the set write intensity $E$, which test information pattern corresponds to a test data pattern encoded by processing means 19b in accordance with said error detection and correction algorithm. In a next step $S_4$ of the method the test data pattern is withdrawn and read. From this test information pattern the error rate ER is determined. In a next step $S_5$ there is determined whether the error rate ER is smaller than an acceptable level ACC. In a next step $S_6$, if the error rate ER is smaller than an acceptable level ACC, a test is made whether the step size $\Delta E$ is smaller than or equal to a minimum step size $\Delta E_{min}$. If this step size is larger, the radiation intensity $E$ is adapted by the step size $\Delta E$ in a next step $S_7$, after which the steps $S_2$, $S_3$, $S_4$ and $S_5$ are repeated. If, in step $S_5$, the error rate ER continues to fall short of the acceptable level ACC, another test is made in step $S_6$ whether the step size $\Delta E$ falls short of the minimum step size $\Delta E_{min}$. If it does, step $S_{14}$, in which a test is made whether the error rate ER falls short of an acceptable level ACC, is followed by step $S_8$ in which the desired radiation intensity $E_W$ is set which is equal to a constant R multiplied by the radiation intensity $E$ set at that moment. The constant R is greater by a factor than 1.1 and smaller than 2.2. Preferably, this factor lies between the limits 1.3 and 1.0 in magnetooptical recording. Once this desired radiation intensity $E_W$ has been set, the programme is stopped in step $S_9$. Up to this point the method according to the invention establishes the lower side $P_{min}$ of the write window shown in FIG. 4, because it is assumed that the initial setting of the radiation intensity $E_I$ lies somewhere in that window between $P_{min}$ and $P_{max}$.

FIG. 6 shows in this situation the initial radiation intensity $E_I$ relative to the write window $P_{min}$ and $P_{max}$. It will be evident that because in step $S_7$ the set radiation intensity is constantly reduced by a step size $\Delta E$, the radiation sensitivity E may at that moment end up below the threshold $P_{min}$ of the write window once a certain step has been made. This will become clear in a next error rate computation in step $S_4$ and the test in step $S_5$ in which the error rate ER is tested with respect to the acceptable error level ACC. In that case step $S_5$ will be followed by step $S_{10}$ in which a test is made whether a counter has been set and has the value of unity. This will be further explained below. If this counter has not been set, a test will be made in step $S_{11}$ whether the step size $\Delta E$ for radiation intensity is smaller than or equal to the minimum step size $\Delta E_{min}$ to be taken. If this is not the case, the radiation intensity $E$ will be increased by the step $\Delta E$ in a next step $S_{12}$. With this newly set radiation intensity $E$, after the adaptation of the intensity step size $\Delta E$ in step $S_2$, the shifting of the information in step $S_3$ and the reading of the information in step $S_4$, the error rate ER is again determined and in step $S_5$ there is tested whether this error rate ER lies below the acceptable level ACC. In the manner described above the knee $P_{min}$ in the error rate characteristic curve and the associated radiation intensity E are found very rapidly. The radiation intensity E thus found is used as a basis for determining a write intensity $E_W$ which is found by multiplying the radiation intensity E by a constant factor R. The result is that information on the record carrier 6 is written with an intensity that exceeds the minimum write intensity $P_{min}$ whilst the information can only just be read out with an acceptable error rate ACC.

The method described above works properly as long as the initial radiation intensity $E_I$ lies within the write window or below the minimum write intensity $P_{min}$. The case where the initial radiation intensity $E_I$ lies above $P_{max}$, that is the knee between the write window and the rising part of the error rate characteristic curve, in the method described above, will effect a setting of the write head 14 in which setting the radiation beam 15 is given an ever higher radiation intensity. This means that the setting control works the wrong way. Therefore, after several iteration steps have been made, in which the intensity step size $\Delta E$ is constantly reduced after the step size $\Delta E$ has been tested in step $S_{11}$, in which step it turns out that the step size $\Delta E$ is now smaller than the minimum step size $\Delta E_{min}$, in step $S_{13}$ the step size $\Delta E$ is again made equal to the initial step size which was assumed in step $S_1$. Furthermore, in step $S_{13}$ a count C is made equal to 1. From there, a feedback is made to step $S_7$ in the procedure described above. In this step $S_7$ the setting of the radiation intensity E is changed, so that the radiation intensity E is reduced, after which, obviously, the known steps $S_2$, $S_3$, $S_4$ and $S_5$ are executed. Now again there may be two situations. The error rate ER found indeed lies below the accepted level ACC, so that the radiation intensity for a next test is reduced via the steps $S_6$ and $S_7$. However, if the error rate ER still lies above the acceptable level ACC, a test is made in step $S_{10}$ whether the count C is indeed equal to 1. If it is, the method is fed back to the steps $S_6$ and $S_7$, so that despite the error rate ER exceeding the acceptable level ACC, yet, in a next test cycle, the radiation intensity E is lower than the previous radiation intensity in the previous test cycle. In other words, from point $E_I$ in FIG. 7 first several test cycles are carried out with radiation intensities E that are larger than the radiation intensities $E_r$, after which a return is made to a radiation intensity E that is smaller than $E_r$. The set counter having count I provides that a test cycle is carried out with an ever lower radiation intensity E, resulting in a moving to the left in the error rate characteristic curve, towards the flat write window between $P_{max}$ and $P_{min}$. Once one has come to within this write window, each next setting of the radiation intensity E will be ever lower, until either the minimum adjustable radiation intensity $E_{min}$ is reached, or the minimum write intensity $P_{min}$ is reached. In the latter case the knee of this minimum write intensity is found sufficiently accurately when several iterative steps around this knee are carried out. Therefore, it is necessary to reset the count of the counter to 0 once the error rate ER has been found in a test in step $S_5$ to be lower than the acceptable level ACC. This should be effected between the steps $S_5$ and $S_6$, whilst a feedback from step $S_{10}$ to step $S_6$ is to take place.

By starting from the middle of the radiation intensity setting range in the preferred embodiment, and by halving the step size after each iteration, the knee $P_{min}$ in the error rate characteristic curve can generally be found after four or five steps. In the preferred embodiment for the method according to the invention, the optimum setting for the radiation intensity of the write head 14 is thus found very rapidly.

Since known standards for zoned record carriers prescribe that the buffer sectors are to be empty, it is to be preferred to erase, once the set value has been determined, all the test information patterns loaded in the buffer sectors. The programme shown in FIG. 6 may thereto include a programme step which is executed immediately before or immediately after the programme has been left for determining the set value, and which step effects the erasure of the buffer sectors used for the media calibration.

Obviously, there are other methods of finding an optimum radiation intensity for the radiation beam 15. An example of such a method will be described hereafter.

In one of the methods this media calibration is carried out in defined buffer sectors near the inner edge and/or outer edge of the record carrier 1. Naturally, first the test area to be written is erased with a sufficiently high erase power, so that a start can be made in a clean test area. Then, based upon a minimum setting of the radiation intensity, several sectors of about 512 user bits each are written to qualify sufficiently reliably the information for each radiation intensity setting. The setting range of the radiation source is passed through from the minimum set value to the maximum intensity set value, for example, from 4 to 8 mW, steps being made of 1/10 mW each. Subsequently, the sectors thus written are read and for each radiation intensity the associated error rate is determined. A criterion could then be that no more than a single sector of the number of written sectors is permitted to be erroneous, that is uncorrectable, with a certain radiation intensity. The radiation intensity can now be derived from the series of the written sectors, whilst the written information can be qualified just barely sufficiently reliably. The radiation intensity at the lower limit of the write window is used in the manner described above for determining the optimum write intensity for the write head 14. Preferably, the multiplier R, which expresses the ratio of the optimum write intensity to the minimum radiation intensity, is selected to be around 1.4.

It will be evident hat the method described with reference to FIG. 5 can be modified in many ways. For example, the step size of radiation intensity ΔE can be maintained at a constant level for the successive iterations until a knee in the error rate characteristic curve is found. After this, the step size could be reduced and the range of the radiation intensities, in which the found knee of the error rate characteristic curve lies, can be covered with this smaller step size, so that the radiation intensity belonging to the knee is determined more accurately and a smaller range in which the knee is situated is established. Then the step size ΔE could again be reduced and so on and so forth, until a desired minimum step size ΔE is attained. Obviously, this modification will require a larger number of steps, which means that the setting of the recording device to the record carrier present at that moment will take longer.

Furthermore, a combination of the method described above and the method described with reference to FIG. 5 is possible. In that case first the setting range of the radiation source is covered with a reasonably large step size ΔE, so that, after executing several steps, the knee of the error rate characteristic curve and its associated range determined by the step size, are known. Subsequently, based upon the write intensity set at that moment, it will be possible to follow the method described with reference to FIG. 5. In that case the method steps $S_{10}$, $S_{13}$, $S_{14}$ and $S_{15}$ in the flow chart shown in FIG. 5 may be omitted.

The methods described above are applicable to many media, such as media with a recording layer consisting of MO or phase-change materials. A restriction, however, is formed by the group of media that have a relatively narrow write window in the error rate characteristic curve. In that case not only the lower limit of the window should be determined, but also the upper limit should be determined in similar fashion, after which the average of the upper and lower limits may be taken as the optimum power.

In the embodiments described above the media calibration is carried out in one of the zones and the obtained set value for the write intensity is then used for recording user information in all the zones. When record carriers are used of which the radiation sensitivity of the recording layer is not uniform for all the zones, it is advantageous to determine the set value for the write intensity for each zone separately.

However, if the radiation sensitivity of the recording layer is not uniform, the media calibration should preferably be carried out in a limited number of zones. The set values for the zones situated between zones for which a media calibration has indeed been carried out may then be obtained by interpolation between the set values obtained with the media calibration for different zones. It is highly attractive to perform media calibrations then in a zone situated near the inner edge of the record player and in a zone situated near the outer edge.

For the purpose of executing the method described hereinbefore, according to which a media calibration is carried out for more than one zone and the set value for intermediate zones is determined by interpolation, the device may include a programme that executes for a number of zones the programme represented by the flow-chart of FIG. 5, and executes an interpolation programme of a customary type to determine the set values for the intermediate zones.

In the foregoing the invention has been further explained for a media calibration in which the set value for the write intensity is determined in response to the error rate in the test information pattern that has already been read out.

However, the invention may likewise be applied to media calibrations of a different type in which also test information patterns are recorded in the buffer sectors. For media calibrations suitable for that purpose, reference be made to, for example, EP-A0 400 726 and EP-A0 404 251, which documents are herewith deemed incorporated in the description by reference.

I claim:

1. A method of recording signals on a record carrier of an inscribable type, the record carrier having substantially concentric tracks in each of a succession of concentric zones, each zone being divided into radial sectors, each radial sector having a header portion and a data portion, the header portions of the radial sectors in each zone being radially aligned; user information patterns of optically detectable marks being recordable in each radial sector by scanning the tracks therein with a radiation beam having a write intensity of a determined set value; said method comprising:

using at least one preselected test write intensity of the radiation beam to write a test information pattern in a buffer sector of at least one of said zones, a buffer sector of a zone being constituted by one or more of the tracks therein nearest an edge of the zone;

reading the written test information and deriving therefrom a corresponding test data pattern; and determining from the test data pattern a set value of the write intensity of the radiation beam for recording user information in the radial sectors of said at least one of said radial zones.

2. Method as claimed in claim 1, characterized in that in dependence on test data patterns corresponding to test information patterns that have been written in buffer sectors of at least two different zones, associated set values of write intensities are determined and, by interpolation between these determined set values, the write intensity set values are determined for writing user information patterns in zones positioned between said different zones.

3. Method as claimed in claim 2, characterized in that said different zones in which test information patterns are written comprise a zone situated near the inner edge and a zone situated near the outer edge of the record carrier.

4. Method as claimed in claim 1, characterized in that the written test information pattern is erased after being read.

5. Method as claimed in claim 1, characterized in that an error rate in the test data pattern is established by means of an error detection and correction algorithm, after which the set value is determined based on the error rate.

6. Method as claimed in claim 5, characterized in that the test information pattern comprises a series of test information sub-patterns which are written with successively increasing test write intensity, after which each test information sub-pattern is read and converted to a corresponding test data sub-pattern, the error rate is determined from each of the test data sub-patterns, from the determined error rates a minimum set value is determined for the write intensity at which the error rate will be at a predetermined lower boundary, and a set value for the write intensity is obtained by multiplying the determined minimum set value by a constant factor.

7. A method as claimed in claim 5, wherein the radiation beam write intensity has a setting range, and further comprising:

(i) initially setting the write intensity at the middle of said setting range and writing a test information pattern;

(ii) reading the written test information pattern deriving therefrom a corresponding test data pattern, and determining an error rate of the test data pattern;

(iii) correcting the write intensity in accordance with the determined error rate;

(iv) repeating steps (i)–(iii) for successive further test information patterns until a knee is found in an error rate vs write intensity characteristic curve of the radiation beam; and (v) determining a set value for the write intensity by multiplying a minimum set value corresponding to the knee of said characteristic curve by a constant factor.

8. Method as claimed in claim 1, characterized in that several test information patterns are written in buffer sectors of one or more of the zones.

9. A recording device for recording information on a record carrier of an inscribable type, the record carrier having substantially concentric tracks in each of a succession of concentric zones, each zone being divided into radial sectors, each radial sector having a header portion and a data portion, the header portions of the radial sectors in each zone being radially aligned; said recording device comprising means for scanning the tracks in said radial sectors with a radiation beam having a write intensity of a determined set value, to thereby write in the radial sectors user information patterns of optically detectable marks, and means for determining said set value of the write intensity; said set value determining means comprising:

means for controlling said scanning means to write a test information pattern in a buffer sector of at least one of said zones, a buffer sector of a zone being constituted by one or more of the tracks therein nearest an edge of the zone; the test pattern being written using at least one preselected test write intensity of the radiation beam;

read means for reading the written test information pattern and deriving therefrom a corresponding test data pattern; and means for determining from the test data pattern said set value of the write intensity of the radiation beam.

10. Device as claimed in claim 9, characterized in that the means for writing test information patterns are arranged for writing test information patterns in buffer sectors of different zones, the set value determining means comprising means for determining the write intensity set value for each of the buffer sectors in which one of the test information patterns has been written, and means for determining, by interpolation between these determined set values, the set values for writing user information patterns in the zones positioned between said different zones.

11. Device as claimed in claim 10, characterized in that means for writing test information patterns are arranged for recording the set test information patterns in a buffer sector of a zone situated near the inner edge of the record carrier and in a buffer sector of a zone situated near the outer edge of the record carrier.

12. Device as claimed in claim 9, characterized in that the device comprises means for erasing the test information pattern in the buffer sector before the user information patterns are written with the determined set value.

13. Device as claimed in claim 9, characterized in that the means for determining the set value comprise data processing means for:

coding a test data pattern with an error detection and correction algorithm prior to a recording of a test information pattern that corresponds to this test data pattern;

determining an error rate in coded test data patterns which error rate is obtained by reading the test information pattern; and determining the set value in response to error rates.

14. Recording device its claimed in claim 13, characterized in that after each cycle in which test information patterns are written in the tracks with a set write intensity, the written test information patterns are read and an error rate is determined of the coded data pattern that belongs to each read test information pattern, a new set value is generated in response to the error rate, and the step size of the set value of the write intensity is reduced.

15. Recording device as claimed in claim 13, characterized in that the knee in the error rate characteristic curve belonging to the minimum test set value having an acceptable error rate is found iteratively, and the set value is obtained by multiplying the determined minimum test set value by a constant factor.

16. Recording device as claimed in one of the claims 13, characterized in that the coded data pattern that corresponds to the test information pattern consists of various information blocks, the number of blocks being at least three, and an acceptable error rate at most one erroneous and uncorrectable information block after reading.

17. Recording device as claimed in claim 9, characterized in that the device comprises means for writing several test information patterns in buffer sectors of one or more zones.

* * * * *